United States Patent [19]
Peters, Jr.
[11] 4,096,767
[45] Jun. 27, 1978

[54] INDEXING AND INTERMITTENT DRIVE MECHANISM

[75] Inventor: Charles Luther Peters, Jr., Norco, Calif.
[73] Assignee: Box Innards, Inc., Anaheim, Calif.

[21] Appl. No.: 779,804
[22] Filed: Mar. 21, 1977
[51] Int. Cl.[2] ........................ B23Q 17/00; F16H 27/02
[52] U.S. Cl. ........................................ 74/822; 74/10.8; 74/142; 83/273; 83/328; 83/436
[58] Field of Search ..................... 74/10.52, 10.8, 10.9, 74/118, 120, 125.5, 816, 822, 827, 142; 83/273, 328, 436; 408/71

[56] References Cited

U.S. PATENT DOCUMENTS 2,786,360 3/1957 Cameron ........................ 74/822 UX
3,149,516 9/1964 Caldwell et al. .................. 83/328 X

FOREIGN PATENT DOCUMENTS 1,520,038 2/1968 France .................................. 83/328

*Primary Examiner*—Willie G. Abercrombie
*Attorney, Agent, or Firm*—Perry E. Turner

[57] ABSTRACT

A control shaft extends through and is rotatable in a housing parallel to a stub shaft therein which has one end extending through one wall thereof. Within the housing are four bevel gears, one being keyed or fixed to the control shaft, a second rotatable on and relative to the control shaft, and the remaining two meshing with the first and second ones and carried on a block that is rotatable on and relative to the control shaft. The second bevel gear is keyed to the larger of a pair of meshing spur gears, such larger gear being rotatable relative to the control shaft and the smaller spur gear being fixed to the stub shaft. Respective discs are fixed on the adjacent ends of the two shafts, and articulated holding devices are operable to alternately hold and release the discs. An external arm adjacent the other end of the control shaft is coupled through the housing to the block, and such arm is reciprocally operable via an external, adjustable eccentric drive that is selectively settable for any desired angle through which the arm is to be stroked. Mechanism for alternately holding and releasing the discs is synchronized with the eccentric drive to effect holding of the stub shaft via its disc throughout one stroke of the arm to permit the control shaft to rotate, and to effect holding of the control shaft via its disc throughout the return stroke of the arm.

10 Claims, 12 Drawing Figures

INDEXING AND INTERMITTENT DRIVE MECHANISM

BACKGROUND OF THE INVENTION

1. Field of the Invention

This invention relates to drive mechanisms for equipment to be intermittently operated.

2. Description of the Prior Art

Intermittent drive mechanisms are well known for intermittently operating various types of equipment. For example, in partition making equipment, a roll of chipboard is to be fed between rollers and past a cutter to be cut into strips of equal length. One of the rollers is a drive roller that is operable via an intermittent drive mechanism which includes a control shaft coupled to the drive roller shaft. The control shaft, and hence the drive roller, is subjected to incremental rotary movements, and the cutter is synchronized with the control shaft movements to cut the strip following each such incremental operation.

Known intermittent drive mechanisms are limited in speed capacities so that desirably high production cannot be realized. Moreover, such known mechanisms exhibit undesired lack of uniformity of intermittent movements, and hence of output results. Thus, partition strips of different tolerances are cut at different speeds. Also, partition strips cut at the higher speeds are not held within desired tolerances, but vary considerably in length from that for which the setting is made pursuant to customer specifications. Still further, such mechanisms are undersirably complex and are characterized by inordinate down time of equipment because parts which need to be replaced are inaccessibly located within the mechanism and require it to be stripped down in order to locate and replace the parts.

SUMMARY OF THE INVENTION

This invention embraces mechanism for intermittently operating a shaft through a multiple of the angular movement of a reciprocally operable control arm, via four intermeshing bevel gears wherein two are directly rotatable by the arm, one is fixed to the shaft, and the other is fixed to one of a pair of meshed spur gears operable with an auxiliary shaft, and wherein both shafts have discs fixed on them at one end, with respective disc holding and releasing means operable to effect alternate holding and releasing of the discs at the ends of the strokes of the control arm. Also embraced are different structures for coupling the control arm to the gears operable directly therefrom. Housings for the parts include all but the discs and the holding and releasing means therefor.

DESCRIPTION OF ILLUSTRATIVE EMBODIMENTS

Figure 1:
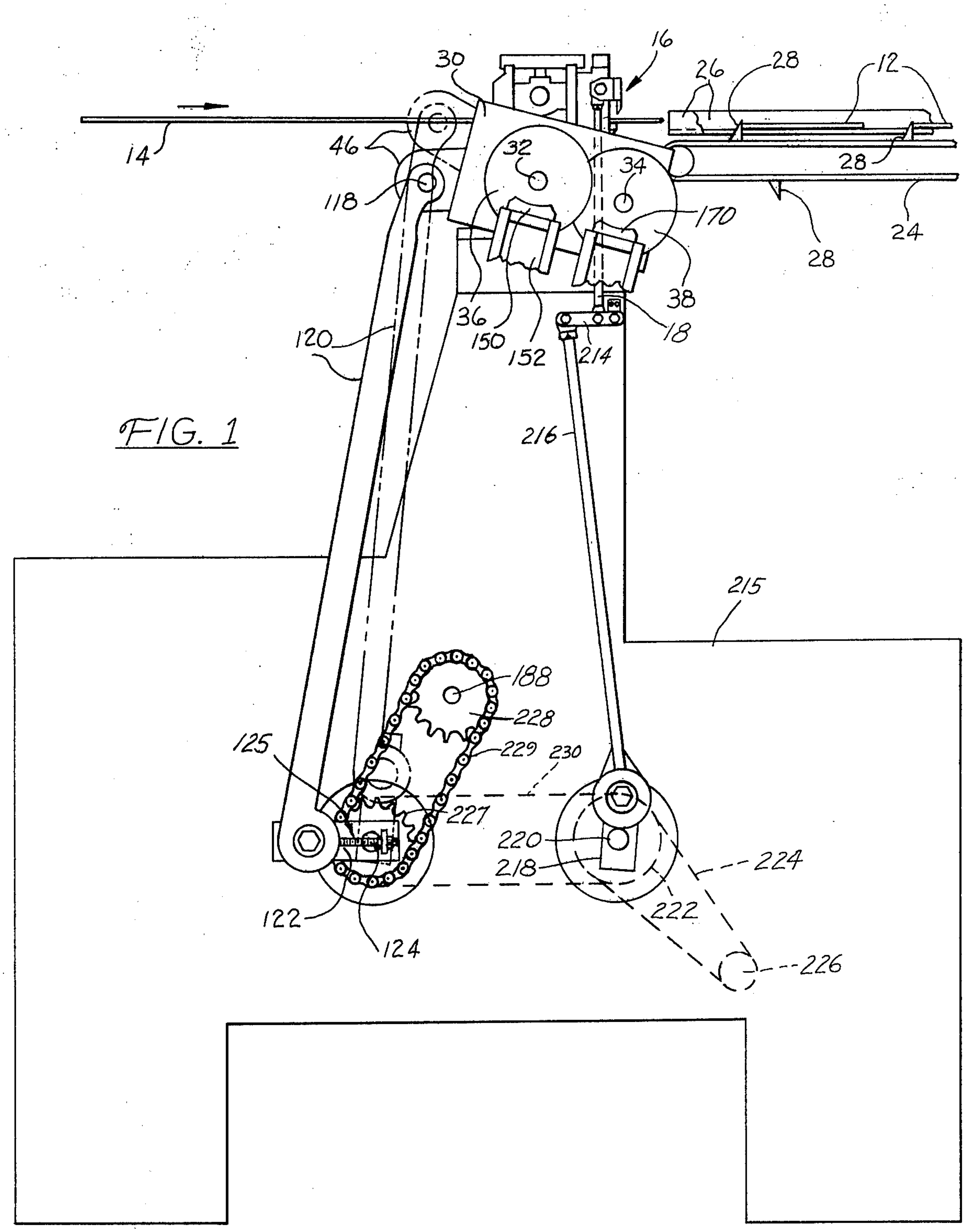
FIG. 1 is a side elevation view of partition strip forming apparatus with the intermittent drive apparatus in accordance with this invention, showing the synchronized drive means including a portion associated with alternately operable disc holding and releasing devices shown partly broken away.
Figure 4:
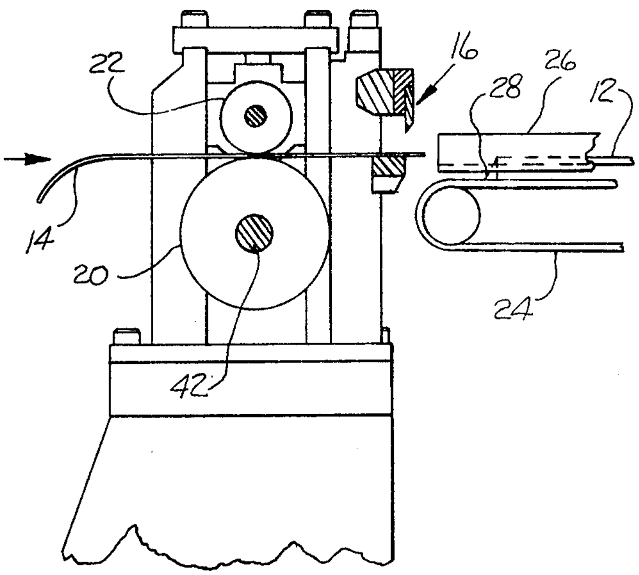
FIG. 4 is a fragmentary sectional view taken along the line 4—4 of FIG. 3.

FIG. 1 shows a machine 10 for forming strips 12 from a sheet 14. The sheet 14 is fed from a suitable source, e.g., a roll of chipboard from which the strips 12 are cut to form partition strips. A knife mechanism 16 is adapted in conventional fashion for vertical movement for forming the strips 12 from the sheet 14, such mechanism being actuated via a link 18 in synchronism with the roller feed for the strip 14. FIG. 4 shows a lower drive roller 20 and an upper roller 22 between which the sheet 14 passes and is fed past the knife 16. The strips 12 are conveyed by suitable means, e.g., as on a conveyor 24 between guide rails 26.

Figure 2:
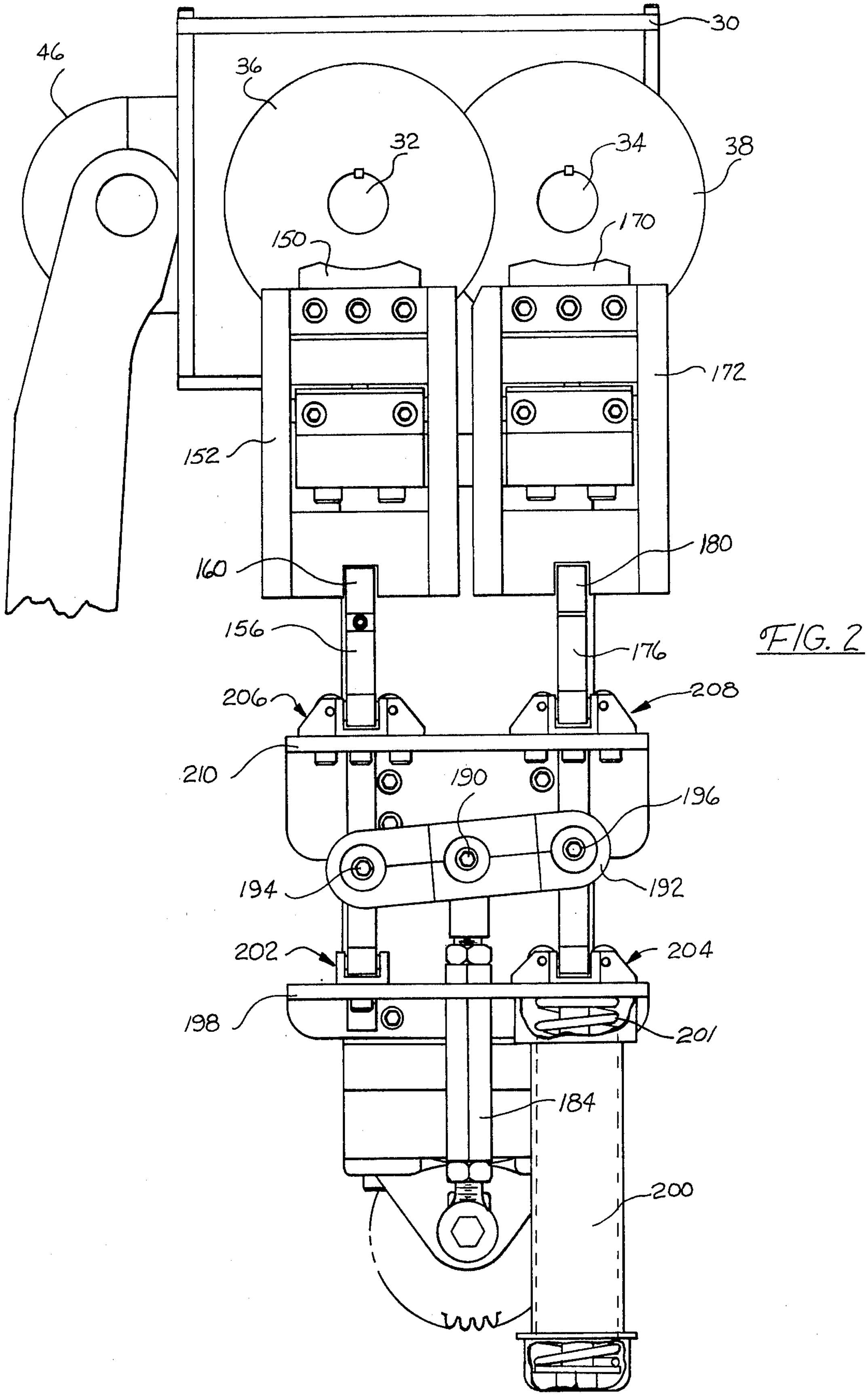
FIG. 2 is a side elevation view of the control mechanism for alternately operating the disc holding and releasing devices, and showing the rod for the control arm broken away below the arm.

For effecting intermittent rotary movement of the drive roller 20 and cutting of the sheet 14 so as to form the strips 12 of the same length, this invention provides a unique intermittent drive and indexing mechanism. Such mechanism includes a housing 30 in which a pair of shafts 32, 34 are rotatably supported. Both shafts 32, 34 extend through one wall of the housing, and have respective discs 36, 38 secured to their ends, as best shown in FIGS. 1 and 2. In FIG. 4, the conveyor belts or chains 24 have spaced pushers 28, the trailing edge of each sheet 12 being engaged by respective pushers on the chains and thereby moved between the side rails 26 to the next station (not shown).

Figure 6:
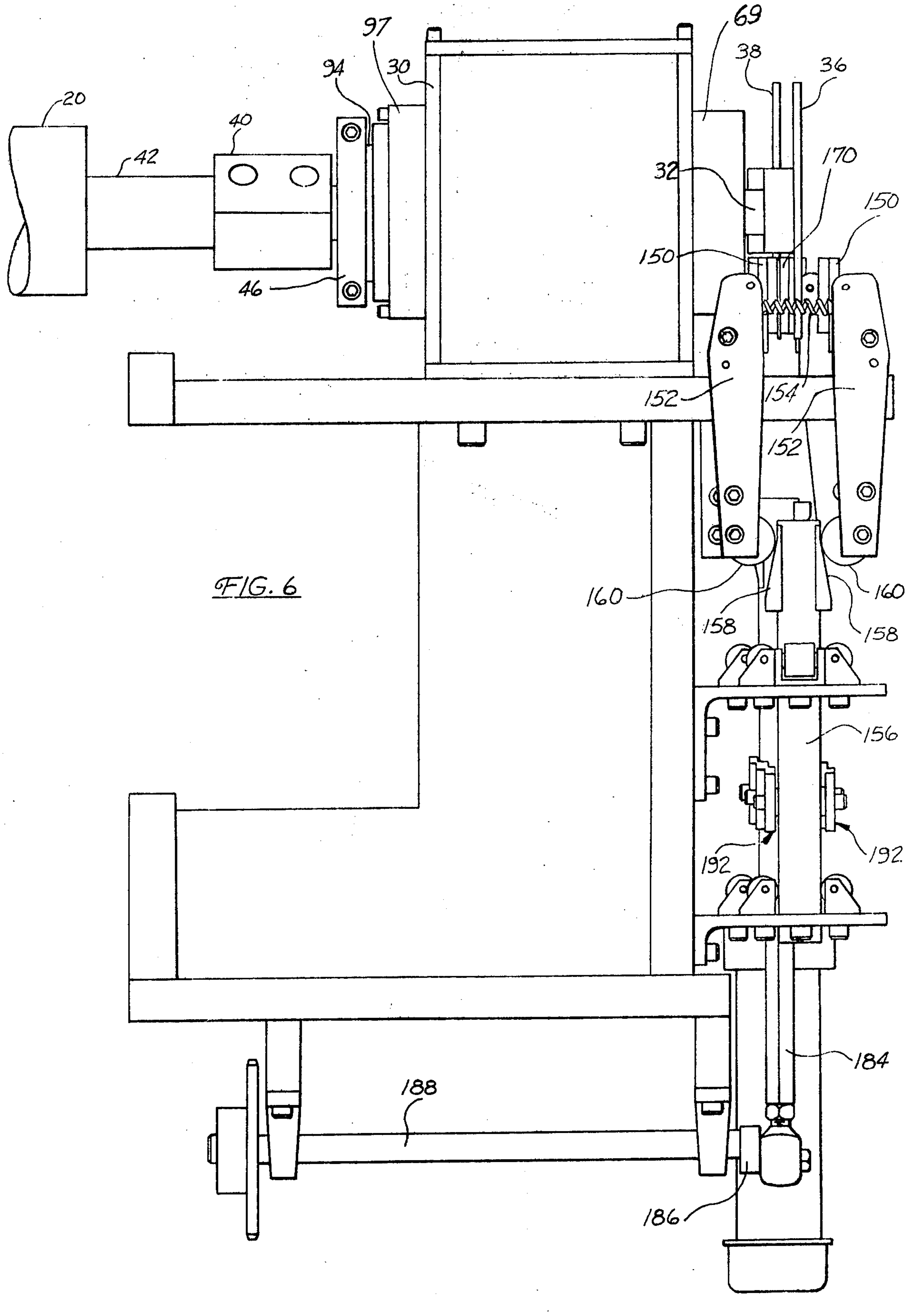
FIG. 6 is a side elevation view of the intermittent drive appartus, showing the controls for the disc holding and releasing means as seen from the left in FIG. 2.

Operation of the drive roller is effected via holding means for alternately holding the discs 36, 38 in stationary position, and indexing means in the housing 30 via which the shaft 32 is controllably indexed and rotated. Referring to FIGS. 1 and 6, the shaft 32 extends through the housing 30, and is suitably coupled at 40 to the shaft 42 of the drive roller 20. Operation of the mechanism within the housing 30 is effected via an arm 46 that is rotatable about the shaft 32, such arm 46 being shown positioned on the shaft between the coupling 40 and the housing 30.

Figure 7:
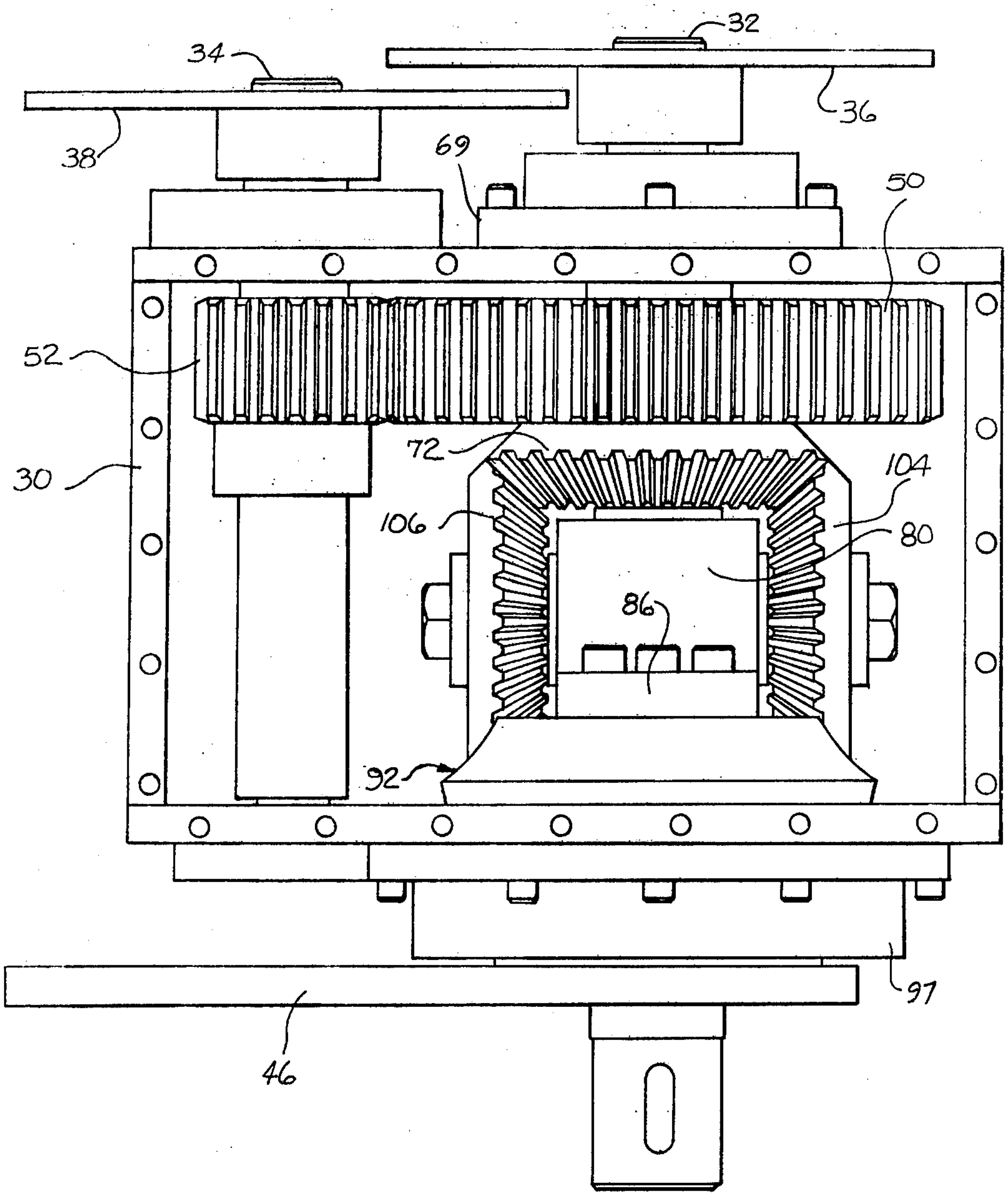
FIG. 7 is a top view of the mechanism within the housing of the intermittent drive apparatus, as seen with the top cover removed.
Figure 9:
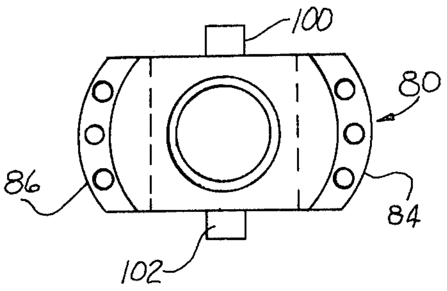
FIG. 9 is a back view of the gear carrying block in FIG. 8.
Figure 10:
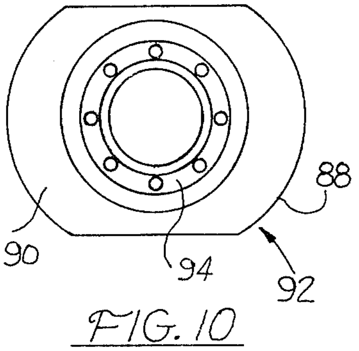
FIG. 10 is an end view of the dome like member of FIG. 8.

The mechanism within the housing 30 is best shown in FIGS. 7–10. The shaft 34 is a stub shaft which is rotatably mounted in the wall through which the one end thereof extends to the exterior, and has its inner end journaled for rotation in the opposite wall of the housing. The shaft 32 is rotatably supported in both walls of the housing. As shown in FIG. 7, respective meshing spur gears 50, 52 are on the shafts 32, 34, with the spur gear 50 on the shaft 32 being substantially larger in diameter than the other spur gear 52. In one example, the ratio of the teeth of the larger gear 50 to those of the smaller gear 52 is 3:1, representing the ratio of 60 teeth on the gear 50 to twenty teeth on the gear 52.

Figure 8:
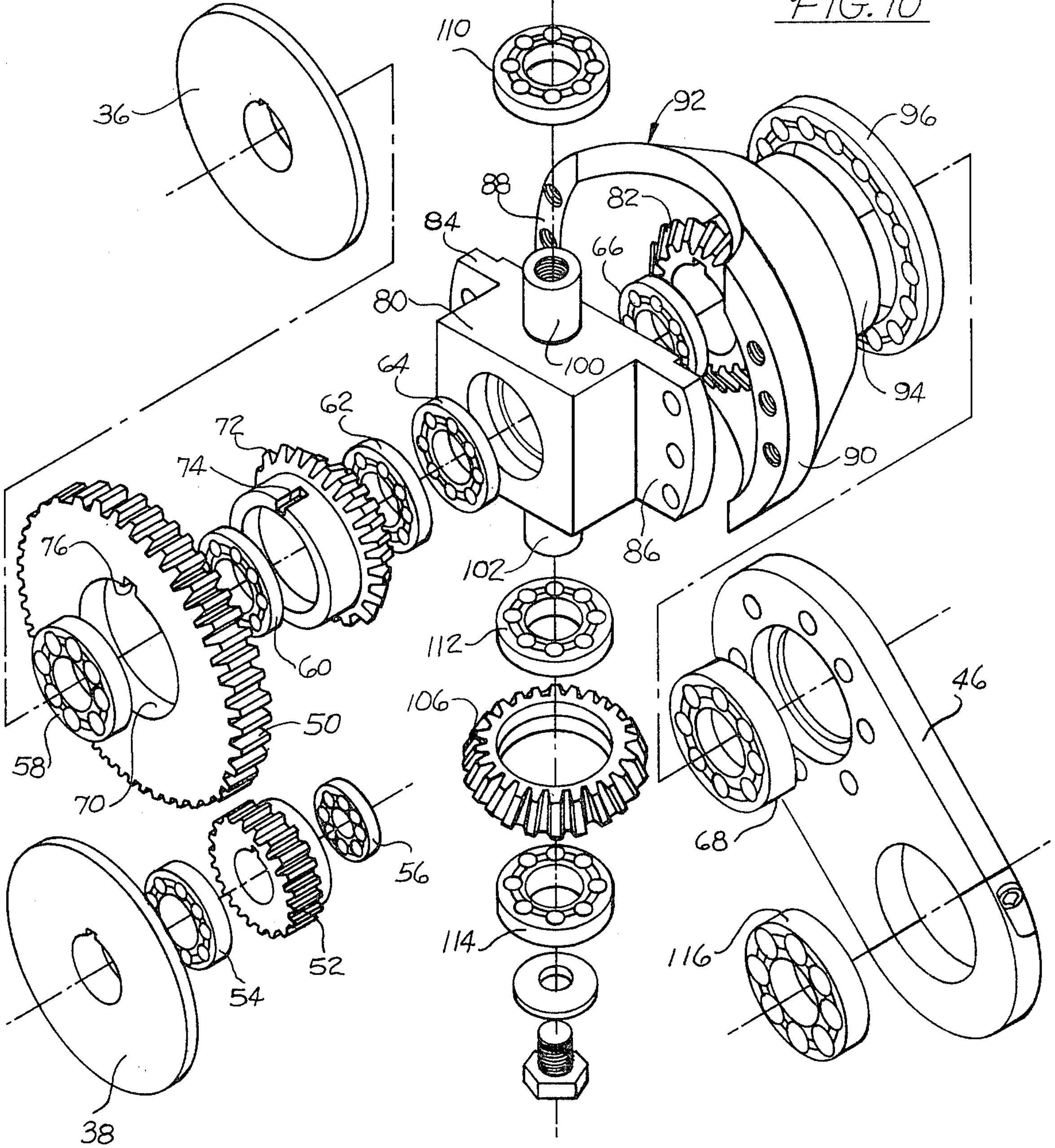
FIG. 8 is an exploded view of the parts within the housing to aid in explaining the operation of the invention.

Referring more specifically to FIG. 8, the stub shaft 34 is rotatable in ball bearings 54, 56 which have their outer races fixed in the opposite walls of the housing 30. The drive shaft 32 which extends through both walls of the housing has the inner races of a plurality of ball bearings secured thereon, such bearings being numbered 58, 60, 62, 64, 66, 68. The outer race of the bearing 58 is mounted in a bearing cap 69 that is secured to the wall of the housing adjacent the disc 36. Bearings 60, 62 have outer races fitted in the body and hub of a bevel gear 72 locked to the spur gear 50 via a key 74 on the hub of such gear and a keyway 76 in the opening 70 of the spur gear 50.

Bearings 64, 66 have their outer races fitted in openings in the opposite walls of a block 80, adjacent to which is a bevel gear 82 that is secured to the shaft 32. The bearing 68 has its outer race fitted part way in an opening in one end of the arm 46. Thus, the disc 36 and the bevel gear are the only elements secured to the shaft 32.

As best seen in FIG. 8, the block 80 has wing flanges 84, 86 extending from one wall, and which are bolted to rim segments 88, 90 at one end of a dome-like member 92. The opposite end of the member 92 has a hub 94 on which the inner race of a ball bearing 96 is fitted. The outer race of such bearing 96 is fitted in a bearing cap 97 that is secured to the wall of the housing 30 adjacent the arm 46. Such arm is a flat member as shown, and is bolted to the end face of the hub 94. The outer race of bearing 68 also fits part way into the interior of hub 94. Thus, rotation of arm 46 rotates member 92 and block 80.

The block 80 has diametrically opposed integral posts 100, 102 on which respective bevel gears 104, 106 are rotatably mounted, e.g., via ball bearings 108, 110 for the gear 104 having their inner races fitted on the post 100 and their outer races fitted in openings in the body and hub extension of the gear 104. Similarly, ball bearings 112, 114 for the gear 106 have their inner races fitted on the post 102 and their outer races fitted in openings in the body and hub extension of the gear 106. Thus positioned, each of the gears 104, 106 meshes with the gears 72, 82. The member 92 is shaped intermediate its rim segments 88, 90 so as to permit such meshing with the gear 82.

The arm 46 is subjected to reciprocal angular movement through a predetermined angle. FIG. 8 shows a ball bearing 116 to have its outer race fitted in an opening in the end of the arm 46 opposite the bearing 68. Referring to FIG. 1 along with FIG. 8, the inner race of the bearing 116 is adapted to receive and be frictionally held on a pin 118 at the upper end of an elongated rod 120. At its lower end the rod 120 is rotatably mounted on one end of an adjustable eccentric wherein a crank bar 122 is secured at one end to a shaft 124, and a threaded adjusting member 125 mounted on the bar 122 supports the lower end of the rod 120, as on a post (not shown) carried on and which is positionable along the bar 122 via, the threaded member 125. Rotation of the bar 122 effects reciprocal movement of the arm 46 through an angle determined by dimensions of the associated parts and setting of the threaded member 125. Accordingly, lengths of strips cut by knife 16 are determined by the adjustment setting. As will be seen, for any setting the indexing mechanism insures that all strips are cut the same length throughout a wide range of speeds.

During downward strokes of the arm 46 the disc 36, and hence the shaft 32, is held stationary, and the disc 38 is held during upward strokes. Upward movement of the arm 46 from its lower position effects rotation of the drive roller 20 to feed the sheet 14 beneath the knife 16, and operation of the knife to cut a strip 12 of the length per the adjustment set. In this regard, referring again to FIGS. 7 and 8, it should be noted that when the disc 36 is held stationary, and the shaft 32 thereby held stationary, the bevel gear 82 also remains stationary because it is keyed to the shaft 32. Movement of the external arm 46 thereby causes the bevel gears or pinions 104, 106 to rotate about the axis of the shaft 32 through the angle of movement of the arm 46. When the disc 38 is held stationary, and the disc 36 is free to move, the shaft 32 and the bevel gear 62 thereon are free to rotate. Since the disc 38 is held stationary, the spur gearing 50, 52 is stationary, as is the bevel gear 72 that is keyed to the large gear 50. Accordingly, rotation of the arm 46, and of the bevel gears 104, 106 therewith, effects rotation of the shaft 32 through an angle precisely twice the angle of movement of the arm 46.

The explanation for the foregoing resides in the fact that while the block 80 carries the bevel gears 104, 106 through the same angle of movement as the external arm 46, such bevel gears 104, 106 simultaneously and additionally rotate the bevel gear 82, and hence the shaft 32, through the same angle of their movement around the stationary bevel gear 72. Likewise, during movement of the arm 46 when the disc 36 is held stationary and the disc 38 is free to move, the bevel gear 72 is rotated through twice the angle of movement of the arm 46.

For the desired accuracy, the shaft 34 must be held stationary during angular movement of the shaft 32 to effect desired rotation of the attached roller and linear movement of the sheet 14. Also, of course, the shaft 32 cannot be allowed to undergo movement while the arm 46 is moving through its return stroke, i.e., from its upper to its lower position as viewed in FIG. 1.

Figure 5:
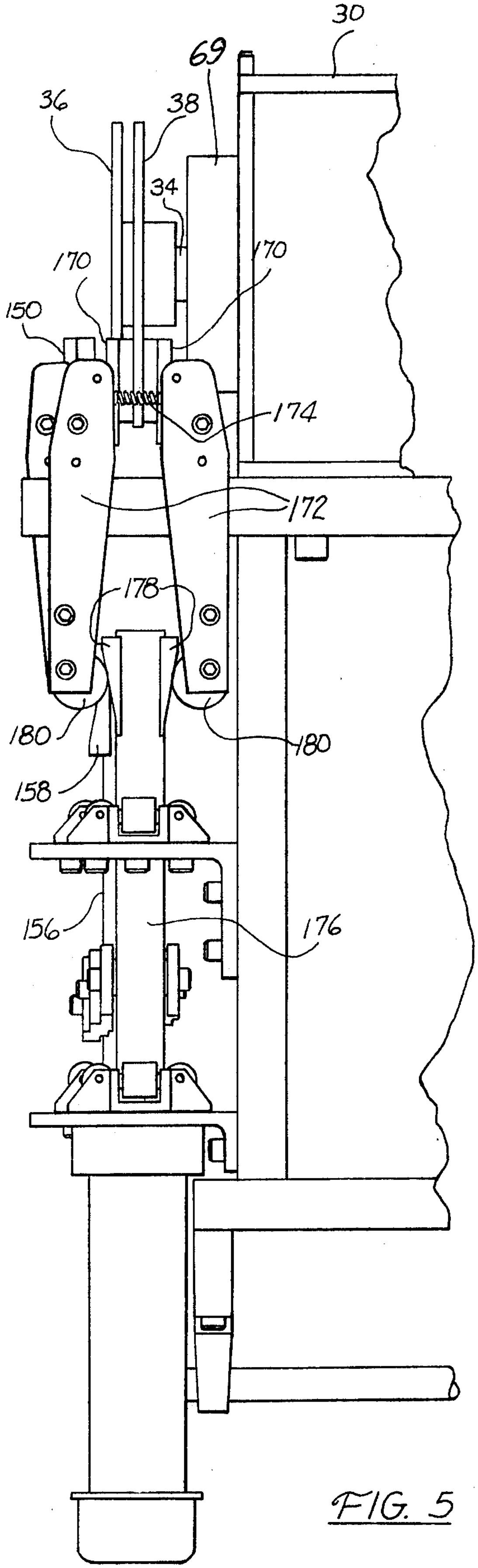
FIG. 5 is a fragmentary side elevation view of the intermittent drive apparatus of the invention, showing the control apparatus for the disc holding and releasing means as seen from the right in FIG. 2.
Figure 3:
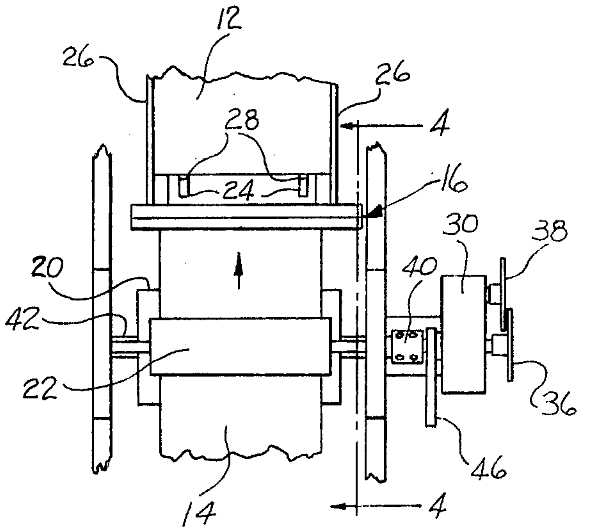
FIG. 3 is a fragmentary top view of the strip forming apparatus and intermittent drive coupled thereto.

Referring now more particularly to FIGS. 2, 5 and 6 along with FIG. 1, the lower portion of the disc 36 is located between the upper ends of a pair of pads 150 which are carried on the upper ends of arms 152 which are pivotally mounted intermediate their ends, as on a portion of the frame support that is common to all the parts. The upper ends of the arms 152 are normally biased apart as by compression springs 154 that extend between them above their pivot points.

To bring the pads 150 into engagement with the opposite faces of the disc 36, provision is made to cam the lower ends of the arms 152 apart and cause the pads 150 to engage and hold the disc 36 immediately upon its reaching stationary position coincident with the control arm 46 reaching its upper position. Such camming in this example is effected via a vertically movable bar 156 having cam faces 158 at its upper end to effect separation of the lower ends of the arms 152. As shown, rollers 160 are carried on the lower ends of the arms 152, and these are kept biased against the cam faces 158 by the force of the springs 154.

In the uppermost position of the cam bar 156, the rollers 160 are sufficiently far apart that the pads 150 are slightly compressed while bearing against the opposite faces of the portion of the disc 36 located between them. As will be seen, immediately upon the control arm 46 reaching its lower position, preparatory to the upward stroke for effecting movement of the roller 20, the cam bar 156 moves downward to permit the springs 154 to separate the upper ends of the arms 152 and the pads 150 to be released from any pressure contact with the disc 36. Thus, the shaft 32 is immediately freed for rotation throughout the entire travel of the arm 46 to its upper position. It will be recalled that during such movement of the arm 46, the shaft 32 is moving through an angle twice that of the movement of the arm 46.

In like fashion, the lower portion of the disc 38 is located between a pair of pads 170 supported on the upper ends of arms 172 which are pivotally mounted intermediate their ends and are normally biased apart via springs 174 extending between them above their pivots. Also, the lower ends of the arms 172 are adapted to be cammed apart via a vertically movable cam bar 176 with cam faces 178 on its upper end against which rollers 180 carried on the lower ends of the arms 172 are urged via the action of the springs 174. However, the upper end of the cam bar 176 extends will above the rollers 180 and the cam faces 178 are tapered oppositely to the cam faces 158 of the other cam bar 156. Thus, the cam faces 178 taper inwardly from the upper end of the bar 176.

When the bar 176 is in its lower position, the cam faces 178 urge the rollers 180 outwardly to cause the pads 170 to press against the portion of the stationary disc 38 and keep it stationary throughout movement of the control arm 46 from its lower to its upper position. As will be seen, the bar 176 is subjected to upward movement immediately upon the control arm 46 reaching its upper position, thereby relieving the pressure of the pads 170 against the disc 38 and freeing the shaft 34 for rotation throughout the return stroke of the arm 46 from its upper to its lower position.

The above described alternating, reciprocal vertical movements of the bars 156, 176 is effected through an eccentric drive. Referring to FIGS. 2 and 6, a vertically movable rod 184 has its lower end rotatably mounted on the outer end of a crank arm 186 that is fixed for rotation on a shaft 188. The upper end of the rod 184 is attached at 190 to a pair of spaced plates 192 which at one end are attached at 194 to the bar 156, and which at the other end are attached at 196 to the bar 176. The lower end of the bar 156 extends slightly below a stationary plate 198, whereas the bar 176 is substantially longer and extends through a housing 200 in which a compression spring 201 has its lower end carried by the lower end of the bar 176, and its upper end bears against the lower surface of the plate 198. Preferably, both bars 156, 176 are supported by vertically spaced guides or stabilizers, such as roller mechanisms 202, 204 mounted on the plate 198, and roller mechanism 206, 208 mounted on a stationary plate 210 positioned above the plates 192.

Again referring to FIG. 2, the plates 192, which are connecting links, are moved up and down to synchronize movements of the cam bars 156, 176 to effect the desired holding and releasing of the discs 36, 38. To further understanding of the operations in this regard, assume that the rod 184 is at its bottom position, in which the pads 170 are in engagement with the disc 38, and the force of the spring 201 is applied through the rod 176, the arms 172 and pads 170 to the disc 38.

During the ensuing upwad movement of the rod 184, the spring 201 during the first half of the rod travel holds the right ends of the plates 192 stationary. This permits the left ends of the plates 192 to move up and force the cam bar 156 up. The cam bar 156 stops when the pads 150 engage the disc 36, whereupon during the remaining half of the upward travel of rod 184 the right ends of the plates 192 are forced upward to carry the cam bar 176 up.

The instant that the left ends of the plates 192 stop and the right ends thereof start up, the spring force is transferred from the disc 38 to the disc 36 through the rod 156, the arms 152 and pads 150 via the plates 192 pivoting at 190. Also, the arm 46 at this instant is at the top of its upward stroke and the shaft 32 is stationary. Thus, the disc 36 is engaged by the pads 150 at the instant the disc 32 becomes stationary. Also at such instant, the disc 38 is released.

On the down stroke of the rod 184, the right ends of the plates 192 move down first because the cam bar 176 is pulled down by the force of the spring 201. During the first half of downward travel of the rod 184, the spring force holds the left ends of the plates 192 stationary. This permits the right ends of the plates 192 to move down and force the cam bar 176 down. The cam bar 176 stops when the pads 170 engage the disc 38. At this instant the arm 46 is at the bottom of its downward stroke, and the shaft 34 is stationary. Also at such instant, the force of the spring 201 is transferred from the disc 36 to the disc 38, thereby releasing the disc 36, and such force remains applied to the disc 38 during the remaining half of the downward travel of the rod 184. Further, during this latter portion of downward movement of rod 184, the right ends of the plates 192 are stationary, and the left ends thereof are pulled down by the action of the rod 184.

To effect the desired synchronization of movements of the arm 46, the knife mechanism 16 and the disc holding and releasing means above described, suitable couplings are made with a prime mover. In the instant example, and referring to FIG. 1, the link 18 for the knife mechanism 16 is connected at its lower end to an intermediate portion of a bar 214 that is pivotally mounted at one end, as to the common frame or base 215 of the equipment, and which has its other end connected to the upper end of a rod 216.

The lower end of the rod 216 is connected to an eccentric drive, as to a crank arm 218 that is rotatable on a shaft 220. Fixed to the shaft 220 is a sprocket 222 that is connected via a chain 224 to the shaft 226 of a prime mover (not shown). Also, sprockets 227, 228 are fitted on the shaft 124 from which the arm 46 is operated, and on the shaft 188 from which the disc holding and releasing mechanism is operated. Chains 229, 230 suitably interconnect sprockets to effect rotation of the shafts in unison. It will be understood that sprockets and chains shown in dotted lines are inside the base 215. Also, it will be understood that there are two sprockets on the shaft 124 and the shaft 220, and respective chains for respective sprocket pairs. Sprockets connected by each chain provide a 1:1 ratio for rotation of their shafts, and if desired all sprockets may be the same size to effect such synchronous rotation.

Figure 11:
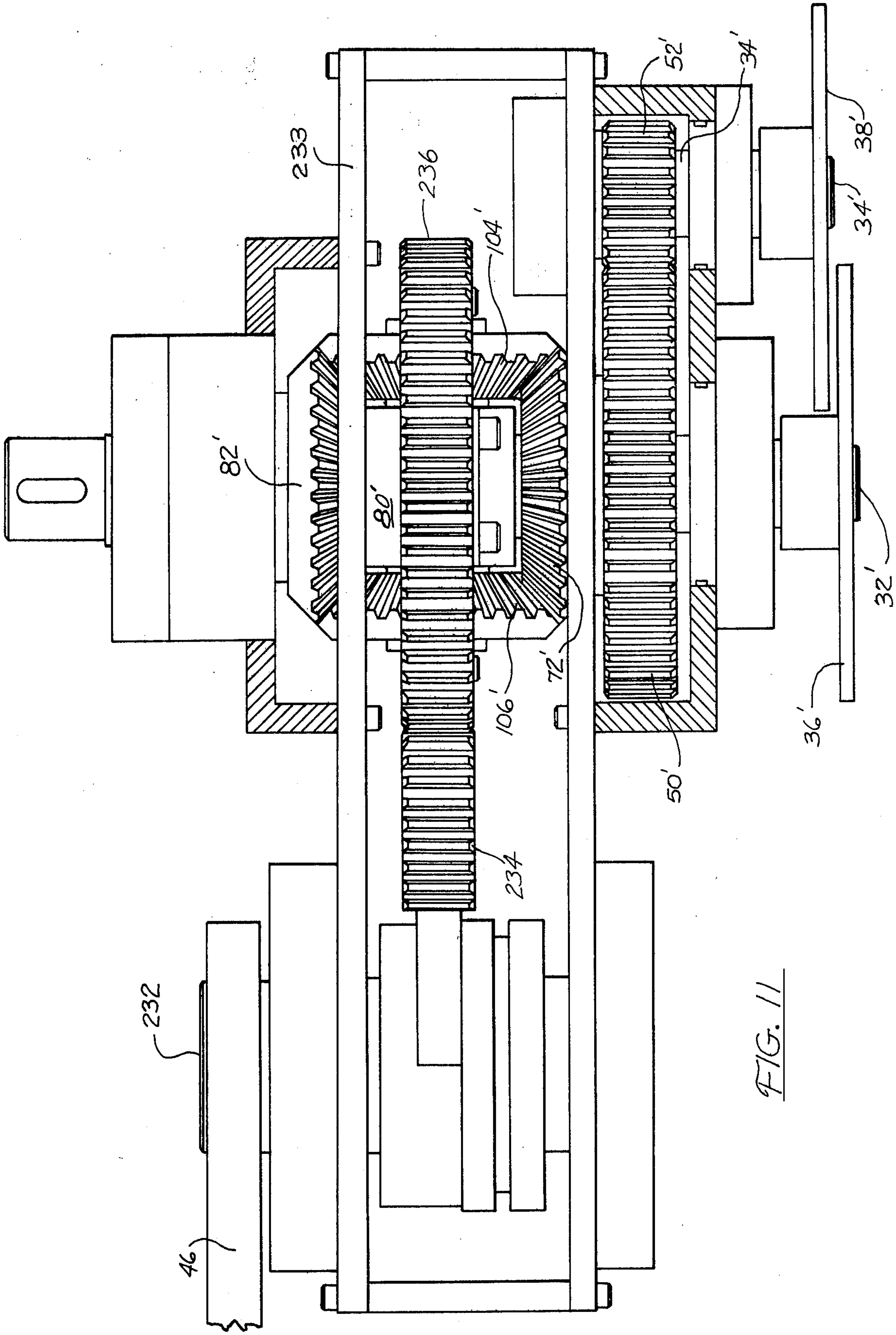
FIG. 11 is a top view of another embodiment of intermittent drive mechanism in accordance with this invention, showing the arrangement of parts within the housing thereof.
Figure 12:
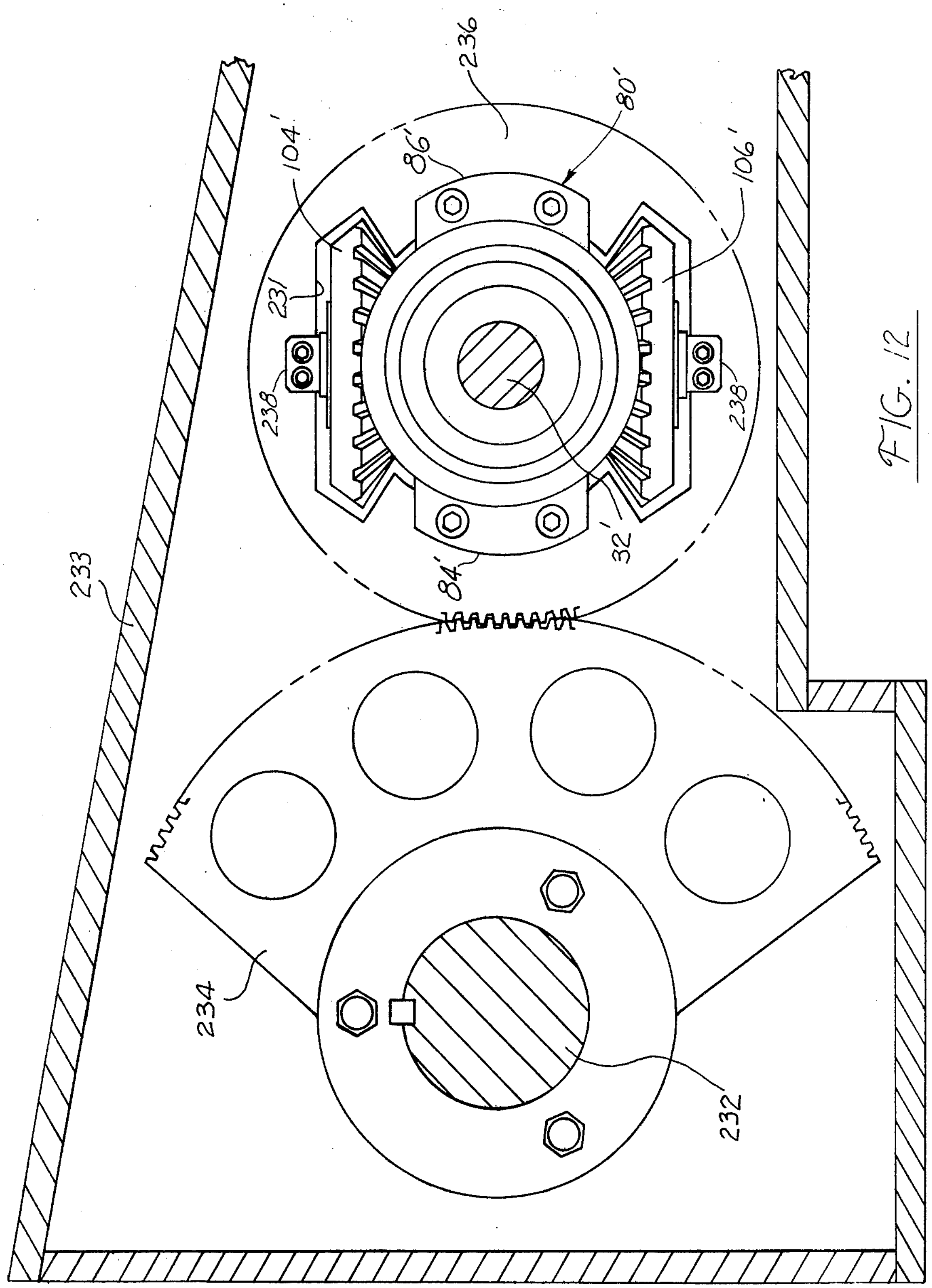
FIG. 12 is a fragmentary sectional view of the housing of the embodiment of FIG. 11, showing in greater detail the relations and structure of the meshing sector and spur gears used therein.

FIGS. 11 and 12 illustrate an embodiment of the invention wherein the drive shaft is stroked through much greater turning to form sheets of sufficient size for pades to be placed in containers to separate layers of items, i.e., to separate vertically stacked multi-cell partitions and the items inserted in the cells thereof. In FIGS. 11 and 12, parts indicated by prime numbers correspond to the base numbered parts heretofore described In this embodiment, the block 80′ and the bevel gears 104′, 106′ mounted thereon are positioned in a cutout 231 in the body of a spur gear 236, and the flanges 84′, 86′ are secured to the body of such gear.

In this embodiment, the arm 46′ is not mounted for rotation on the axis of the drive shaft 32′, but is fixed to the end of a stub shaft 232 that is supported in opposite walls of the housing 233. A sector gear 234 is fixed on the shaft 232 within the housing, and meshes with the spur gear 236. Gears 104′, 106′ also are secured at 238 to the spur gear 236. In this arrangement, the reciprocal angular movements of the arm 46′ are effected as for the arm 46 of the embodiment first described, as is the alternate releasing and holding of the discs 36′, 38′. The gear ratio of the sector gear 234 to the spur gear 236 is selected to provide the desired angular movement of the drive shaft 32′ during the drive stroke of the arm 46′. In this regard, the ratio of the sector gear to the spur gear may be chosen to effect rotation of the shaft 32′ that is any desired multiple of the angular movement of the arm 46′.

With the indexing and intermittent drive in accordance with this invention, strip forming apparatus is operable at very high speeds while maintaining precise lengths of cut. Thus, for apparatus wherein the drive roller is three feet long and eight inches in diameter, this invention permits operations up to 4,000 inches per minute of feed roll while maintaining tolerances better than 0.015-in. for any size strips cut. This contrasts to prior art apparatus wherein intermittent drives permit no more than one-half to sixty percent such speed, while still being unable to maintain tolerances better than 0.030-in. for strips cut thereby.

I claim:

1. In combination:

a housing;

a shaft extending through opposite walls of said housing, said shaft being adapted to be coupled at one end to apparatus to be intermittently operated;

a first bevel gear in said housing fixed to said shaft;

a pair of spaced bevel gear pinions on an axis at right angles to the axis of said shaft, said pinions both being in mesh with said first bevel gear;

means supporting said pinions for angular movement in unison about said shaft;

means to reciprocally rotate said pinions about said shaft through a predetermined angle;

means to effect rotation of said first bevel gear and said shaft during angular movement of said pinions in one direction;

and means to prevent rotation of said first bevel gear and said shaft during angular movement of said pinions in the opposite direction.

2. The combination of claim 1, wherein said means to effect rotation of said first bevel gear and said shaft includes a further bevel gear on said shaft and rotatable relative thereto;

said pinions both being in mesh with said further bevel gear;

a spur gear on said shaft and rotatable relative thereto with said further bevel gear and keyed to said further bevel gear;

an auxiliary shaft rotatable in said housing and having one end extending through one wall thereof;

a spur gear on said auxiliary shaft meshing with said first-mentioned spur gear;

means for releasably holding the one end of said auxiliary shaft during angular movement of said pinions in said one direction, and releasing the same during angular movement of said pinions in said opposite direction;

and means for releasably holding said first-mentioned shaft at its opposite end during angular movement of said pinions in said opposite direction, and releasing the same during angular movement of said pinions in said one direction.

3. The combination of claim 2, wherein said holding and releasing means includes respective discs fixed to said one end of said auxiliary shaft and said opposite end of said first-mentioned shaft;

friction elements for engaging said discs;

respective supports for said friction elements for the respective discs;

means normally biasing said supports to positions of nonengagement of said elements with said discs;

and cam means for said supports operable to alternately move them between positions of nonengagement and engagements of said elements with said discs;

4. The combination of claim 3, wherein said means to reciprocally rotate said pinions includes an external arm;

and means directly coupling said arm to said pinions;

and means for reciprocally moving said arm through a predetermined angle, said coupling means effecting reciprocal movements of said pinions with said arm.

5. The combination of claim 4, wherein said arm is rotatable on an axis parallel to said first-mentioned shaft.

6. The combination of claim 4, wherein said arm is rotatable on and relative to said opposite end of said shaft.

7. The combination of claim 5, including a sector gear in said housing;

a further shaft rotatable in said housing and having one end extending to the exterior of said housing, said arm being fixed to the one end of said further shaft; and a spur gear encircling said pinions, said pinions being movable by said encircling spur gear, and said encircling spur gear being in mesh with said sector gear.

8. The combination of claim 6, wherein said means supporting said pinions includes a block having posts thereon, said pinions being rotatably supported on said posts;

a member secured to said block and extending through one wall of said housing;

and means securing said arm to said member.

9. The combination of claim 8, wherein said member secured to said block includes a hub;

a ball bearing fitted on said hub to permit its rotation in the adjacent wall of said housing, said arm being secured at one end to the external radia face of said hub.

10. The combination of claim 3, wherein supports for said friction elements each comprise a pair of plates pivotally amounted adjacent the associated disc, said friction elements including friction pads held by each of the pair of plates, the plates of each pair being adapted for reciprocal movement to bring the pads thereon against and away from the disc;

spring means extending between the plates of each pair and normally biasing them apart.

* * * * *